March 17, 1959

E. B. MILLER 2,877,861

METHOD OF AND SYSTEM FOR RECOVERING H₂S
FROM NATURAL GAS CONTAINING A HIGH
PERCENTAGE OF H₂S

Filed Dec. 23, 1957

INVENTOR
ERNEST B. MILLER

Adams + Bush
ATTORNEYS

March 17, 1959 E. B. MILLER 2,877,861
METHOD OF AND SYSTEM FOR RECOVERING H$_2$S
FROM NATURAL GAS CONTAINING A HIGH
PERCENTAGE OF H$_2$S
Filed Dec. 23, 1957 6 Sheets-Sheet 2

INVENTOR
ERNEST B. MILLER

BY Adams + Bush
ATTORNEYS

March 17, 1959

E. B. MILLER 2,877,861

METHOD OF AND SYSTEM FOR RECOVERING $H_2S$
FROM NATURAL GAS CONTAINING A HIGH
PERCENTAGE OF $H_2S$

Filed Dec. 23, 1957

INVENTOR
*ERNEST B. MILLER,*
BY
ATTORNEYS

March 17, 1959 E. B. MILLER 2,877,861
METHOD OF AND SYSTEM FOR RECOVERING H₂S
FROM NATURAL GAS CONTAINING A HIGH
PERCENTAGE OF H₂S Filed Dec. 23, 1957 6 Sheets-Sheet 5

INVENTOR
ERNEST B. MILLER

BY Adams & Bush
ATTORNEYS

INVENTOR
ERNEST B. MILLER

BY

ATTORNEYS

United States Patent Office 2,877,861
Patented Mar. 17, 1959

2,877,861

METHOD OF AND SYSTEM FOR RECOVERING H₂S FROM NATURAL GAS CONTAINING A HIGH PERCENTAGE OF H₂S

Ernest B. Miller, Houston, Tex., assignor to Jefferson Lake Sulphur Company, New Orleans, La., a corporation of New Jersey Application December 23, 1957, Serial No. 704,795

14 Claims. (Cl. 183—4.6)

This invention relates to adsorption processes for treating fluids to remove and/or recover particular constituents of the fluid and has more particular reference to cyclic adsorption processes of the type comprising an adsorption cycle in which the fluid being treated passes through one or more adsorption stages of the adsorber; an activation cycle employing a captive activation gas recycled through a heater and the activation stage of the adsorber to desorb the particular constituent accumulated in the adsorbent material and reactivate the material.

One object of the present invention is to provide a novel and improved cyclic adsorption process for treating fluids to remove and/or recover a particular constituent therefrom, as characterized above, which employs a series of adsorbers and comprises an adsorption cycle in which a continuous flow of the fluid being treated is directed, under high pressure, in succession and in series through one or more adsorption stages in each of the series of adsorbers so that substantially all of the particular constituent content of the fluid which is to be recovered will be adsorbed by the beds of adsorbent material in the adsorption stages; a plurality of activation cycles, one associated with each adsorber, in which a flow of a captive activation medium, under high pressure, is continuously recirculated through a heater and an activation stage, so that the concentration of desorbed products is built up to a high concentration by volume; a plurality of purging cycles associated with each adsorber to prevent dilution of the recycling activation medium; and a constituent product recovery cycle in which a portion of the recycling activation medium, in each adsorber, starting with the adsorber through which the fluid being treated makes its last passage, is bled off and passed into the recycling flow of activation medium in the next succeeding adsorber of the series of adsorbers, with the bled off portion of recycling activation medium from the adsorber through which the fluid being treated first passes being the finished product.

A further and more limited object of the present invention is to provide a novel and improved cyclic adsorption process, as characterized above, for removing and recovering H₂S from natural gas having a large content of H₂S.

Other objects and advantages of the invention will appear in the following specification when considered in connection with the accompanying drawings, in which.

The present invention provides a novel and improved process for removing and/or recovering particular constituents from fluids. The process is a continuous cyclic adsorption process employing a series of adsorbers in each of which at least one bed of adsorbent material is maintained in a plurality of stages and in general, comprises an adsorption cycle in which a continuous flow of the fluid being treated is directed, under high pressure, in succession and in series through one or more adsorption stages in each of the series of adsorbers so that substantially all of the particular constituent content of the fluid which is to be recovered will be adsorbed by the beds of adsorbent material in the adsorption stages; a plurality of activation cycles, one associated with each adsorber, in which a flow of a captive activation medium, under high pressure, is continuously recirculated through a heater and an activation stage, so that the concentration of desorbed products is built up to a high concentration by volume; a plurality of purging cycles associated with each adsorber to prevent dilution of the recycling activation medium including a first purging cycle in which the effluent fluid from a second purging cycle is continuously passed into a purging stage immediately preceding the activation stage, called the first purging stage, with the effluent fluid from the first purging stage passing into the flow of the fluid being treated on its way to the first adsorption stage, and a second purging cycle in which a portion of the effluent stripped fluid from the last adsorption stage is continuously diverted and passed into a purging stage immediately following the activation stage, called the second purging stage, with the effluent fluid from the second purging stage passing into the first purging stage; the periodical shifting of the relative positions of the particular adsorbent material and the particular flow of fluid through each stage of each adsorber, either by moving the beds successively through the stages or by shifting the flows of fluid through the several stages, so that each stage in each adsorber becomes, in succession, a first purging stage, an activation stage, a second purging stage, and an adsorption stage; and a constituent product recovery cycle in which a portion of the recycling activation medium, in each adsorber, starting with the adsorber through which the fluid being treated makes its last passage, is bled off and passed into the recycling flow of activation medium in the next succeeding adsorber of the series of adsorbers, with the bled off portion of recycling activation medium from the adsorber through which the fluid being treated first passes, being the finished product.

While the novel and improved process of the invention may be employed to remove and/or recover various constituents from various fluids, it is particularly adapted for removing and recovering H₂S from natural gas containing a high percentage of H₂S and such a process will hereinafter be described.

While any suitable usual type of adsorption apparatus may be employed to practice the process of the present invention, for purpose of illustration, the process will be described as carried out by employing a series of adsorbers of the rotary type in which a plurality of elongated upright closed vessels containing adsorbent material are rotated directly in succession and substantially continuously through the various stages of the adsorber.

Figure 1:
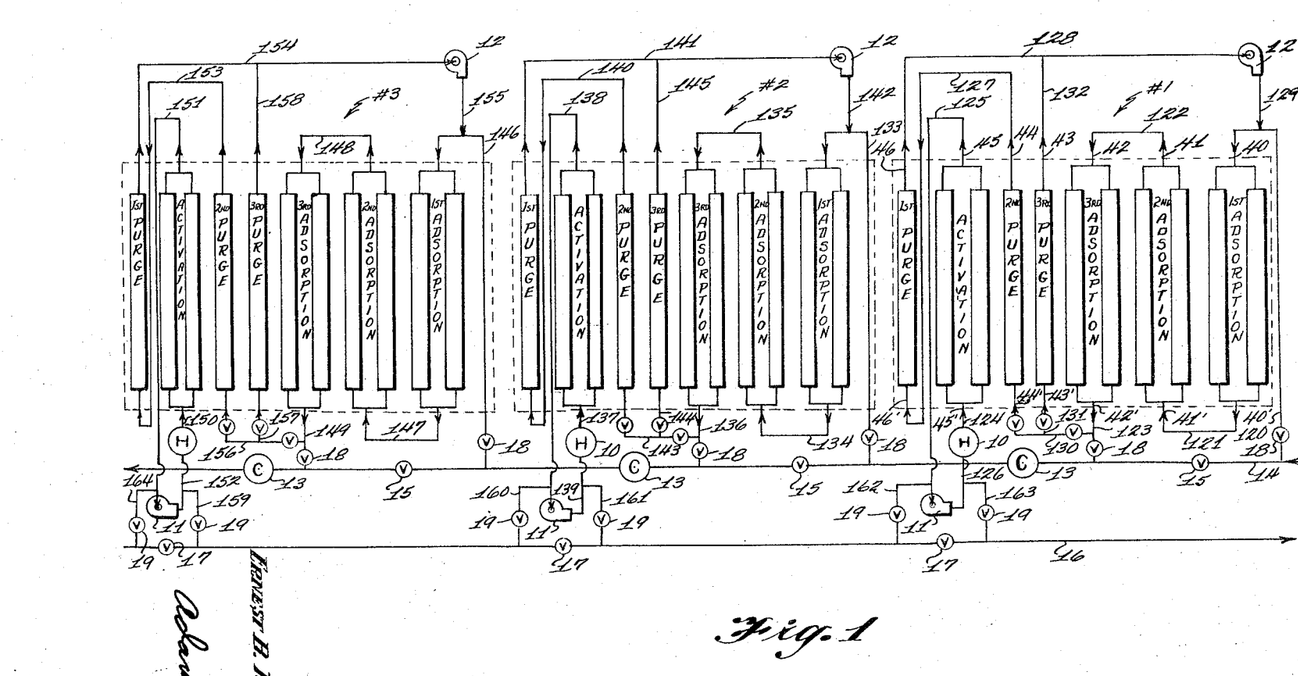
Fig. 1 is a schematic view showing one embodiment of apparatus and arrangement thereof for carrying out the method of the present invention and the flow of the various fluids therethrough.

Referring now to the drawings, there is shown, in Fig. 1, one embodiment of apparatus and the arrangement thereof for carrying out the process of the invention. The apparatus shown includes a series of seven stage rotary adsorbers, three such being shown and numbered #1, #2 and #3. The three adsorbers are identical and each has three stages employed as adsorption stages, three stages employed as purging stages, and one stage employed as an activation stage. Each adsorber is shown as having associated therewith a heater 10 for heating the activation gas, a fan or blower 11 for continuously recycling the activation gas through the heater and the activation stage of the adsorber, a blower 12 for pulling the purging gas through the purging stages, and a heat exchanger or cooler 13 for cooling the gas being treated as it passes from the last adsorption stage of the adsorber to the succeeding adsorber in the series of adsorbers.

A header or manifold pipe line 14 passes the gas to be treated through the series of adsorbers and has a plurality of cut-out valves 15 therein, one associated with each adsorber for cutting in or out the adsorber.

A header or manifold pipe line 16 passes the bleed off activation gas from one adsorber to the other in a direction opposite to the direction of travel of the gas being treated through the series of adsorbers and has a plurality of cut off valves 17 therein, one associated with each adsorber for cutting in or out the adsorber.

Cut off valves 18 are mounted in the take off and return pipe lines connecting the adsorbers to the manifold pipe line 14; and cut off valves 19 are mounted in the take off and return pipe lines connecting the adsorbers to the bleed off manifold pipe line 16.

As shown in Figs. 2 to 11, inclusive, the adsorber comprises an elongated upright cylindrical pressure vessel 20 having flanged vertically aligned circular openings 21, 22 in its top and bottom walls, respectively, closed by top and bottom flanged cover plates 23, 24, removably secured to cover said openings, as by bolting; suitable framework, indicated at 25, for supporting the vessel 20 in an upright position, a rotatable vertical shaft 26 extending through the pressure vessel 20 with its upper end journaled in a suitable cap bearing carried by the upper closure member 23 and with its lower end extending through a suitable shaft seal, secured to the bottom of the lower closure member 24; a vertical shaft 27 coupled to the bottom end of the shaft 26 and connected to suitable differential gearing, indicated at 28, driven by a motor 29; a support disc 30 fixedly mounted on the shaft 26 for rotation therewith within said pressure vessel and providing support for a plurality of elongated fluid treating material containing cylindrical vessels 31; upper and lower distributive assemblages, indicated generally at 32, 33, each assemblage comprising an annular stationary member 34 having a plurality of compartments or manifolds formed therein, a tube sheet disc valve 35 slidably mounted on the shaft 26 for rotation therewith, a spring support disc 36 fixedly mounted on the shaft 26 and supporting a plurality of coiled springs 37 which engage the tube sheet disc valve 35 and tightly press it against the open end of the annular stationary member 34; a plurality of flexible pipes 38, each connecting the upper end portion of one of the vessels 31 and the tube sheet disc valve 35 of the upper distributive assemblage; a plurality of flexible pipes 39, each connecting the lower end portion of one of the vessels 31 and the tube sheet disc valve 35 of the lower distributive assemblage, a plurality of inlet-outlet conduits, seven such being shown, 40, 41, 42, 43, 44, 45 and 46, connected to the annular stationary member 34 of the upper distributive assemblage and extending upwardly through the upper cap closure member 23, for the ingress and egress of fluids to and from the upper stationary member 34; and a plurality of inlet-outlet conduits, seven such being shown, 40', 41', 42', 43', 44', 45', and 46', connected to the annular stationary member 34 of the lower distributive assemblage and extending downwardly through the lower cap closure member 24 for the ingress and egress of fluids to and from the lower stationary member 34.

Figure 4:
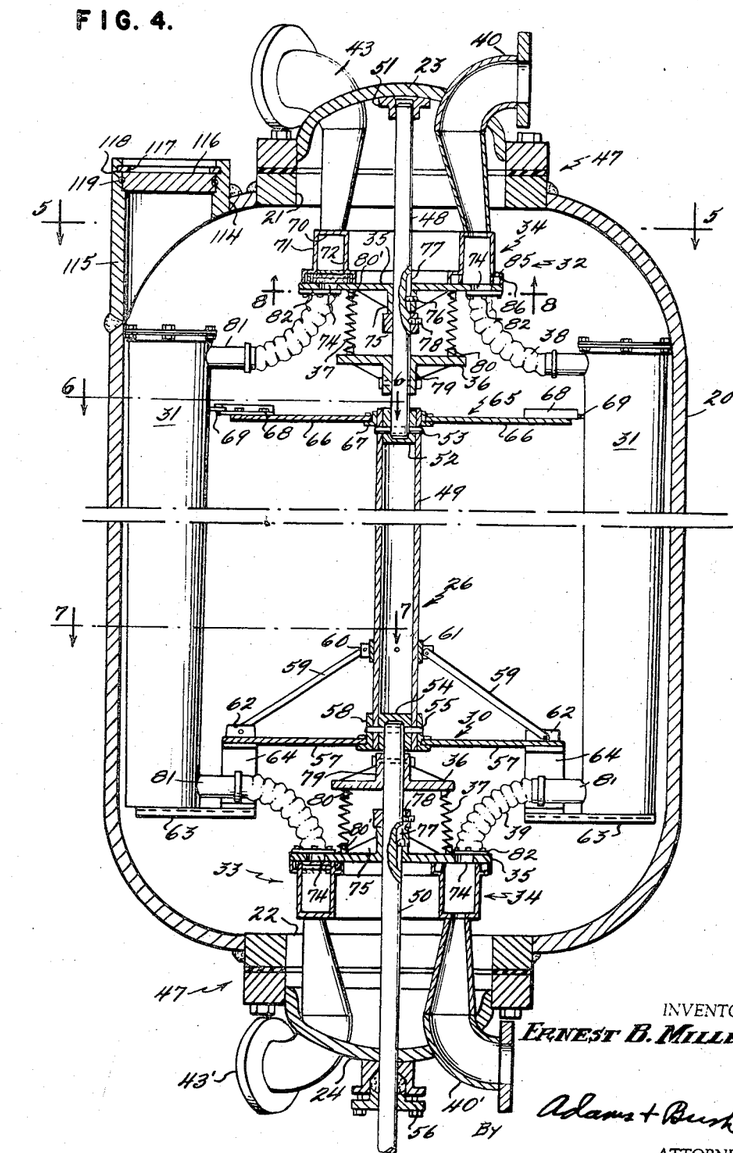
Fig. 4 is a vertical sectional view taken on the line 4—4 of Fig. 3, but omitting the driving apparatus.
Figure 5:
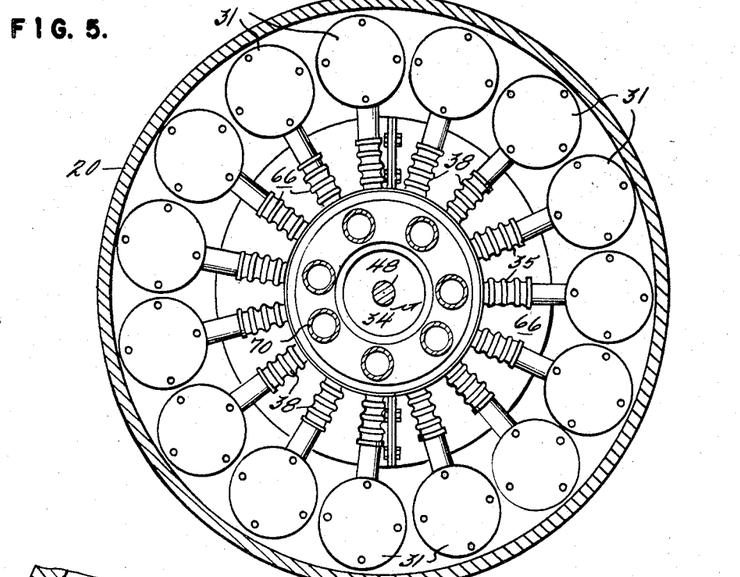
Fig. 5 is a horizontal sectional view taken on the line 5—5 of Fig. 4.
Figure 6:
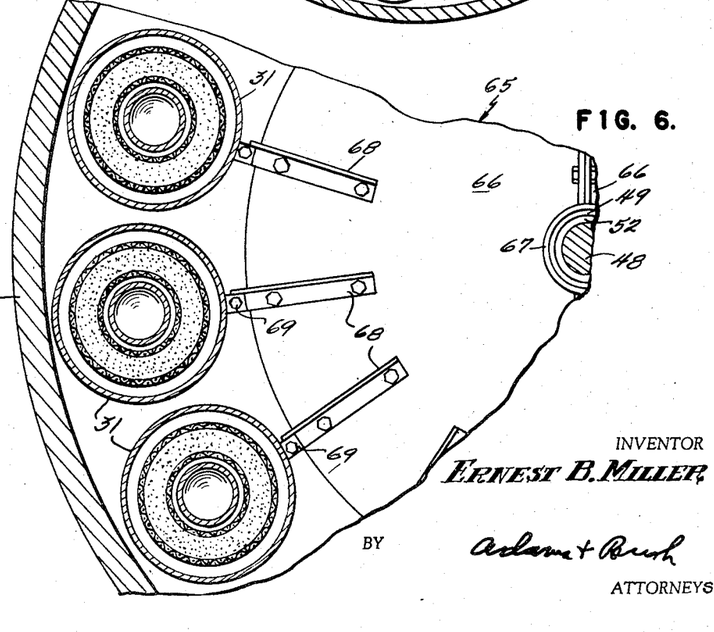
Fig. 6 is a fragmentary sectional view taken on the line 6—6 of Fig. 4, showing the manner of bracing the upper ends of the elongated adsorbent material containing vessels.

The cylindrical pressure vessel 20 and the cap cover members 23, 24 are preferably made of heavy boiler plate. The flanges formed in the peripheries of the openings 21, 22 of the vessel 20 and the peripheries of the cap cover members 23, 24 are preferably formed of heavy iron rings, rectangular in cross section and are welded to the peripheral edges of the openings and the cover plates, as indicated at 47.

The shafting 26, preferably and as shown, is formed of three sections, an upper section 48, an intermediate section 49 and a lower or bottom section 50. The upper and lower sections 48 and 50 consist of solid rod, round in cross section. The intermediate section 49 consists of a hollow pipe having an internal diameter considerably larger than the diameters of the upper and lower sections.

The upper section 48 has its upper end journaled in a suitable cap bearing 51 carried by the upper cover member 23 and its lower end supported in a support bushing 52 mounted in the upper end of the intermediate section 49, with a pin 53 passing through the two sections and the bushing for rigidly and detachably securing the two sections together.

The bottom section 50 has its upper end engaged in a support bushing 54 mounted in the lower end of the intermediate section 49 with a pin 55 passing through the two sections and the bushing for rigidly and detachably securing the two sections together, and with its lower end extending through the lower cover member 24 and a suitable shaft seal 56 and coupled to the upper end of the shaft 27.

The support disc 30 which supports the cylindrical vessels 31 is composed of two semi-annular flat pieces 57, the inner adjacent straight edges of which are provided with flanges which are bolted together to form the complete disc. This is to permit of assembling the disc within the pressure vessel 20.

The disc 30 (see Figs. 4 and 7) is fixedly secured, as by bolting, to a collar 58 fixedly secured to the intermediate section 49 of the shaft 26, so that the disc will rotate with the shaft. The outer peripheral edge portion of the disc 30 is supported by means of a plurality of supporting links or arms 59, each having its upper end bolted to one of a plurality of circumferentially spaced lugs 60 carried by a collar 61 fixedly secured to the intermediate section 49 of the shaft 26 and its lower end bolted to one of a plurality of circumferentially spaced upstanding lugs 62 secured to the upper surface of the disc 30.

Figure 7:
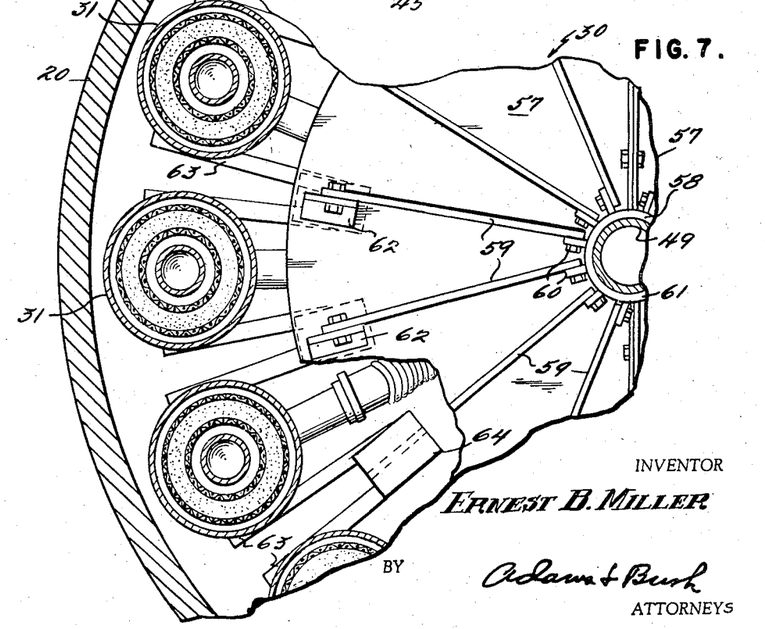
Fig. 7 is a fragmentary sectional view taken on the line 7—7 of Fig. 4, showing the manner of supporting the lower ends of the elongated adsorbent material containing vessels.

The vessels 31 are supported by the disc 30, as by means of a plurality of supporting links or arms 63 in the form of short sections of structural angles, each arm 63 having its outer end portion fixedly secured to the bottom and one side of one of said vessels 31, as by welding, and its inner end portion fixedly secured, as by bolting, to one of a plurality of circumferentially spaced dependent lugs 64, in the form of short sections of I-beams, welded to the under surface of the disc 30 (see Figs. 4 and 7).

Means may be provided for holding the cylindrical vessels 31 in their upright position encircling the shaft 26. In the particular embodiment of the invention illustrated, such means are shown as comprising a disc 65 composed of two semi-annular flat pieces 66, 66, the inner adjacent straight edges of which are provided with flanges which are bolted together to form the complete disc. This is to permit of assembling the disc within the pressure vessel 20. The disc (see Figs. 4 and 6) is fixedly secured, as by bolting, to a collar 67 fixedly secured to the intermediate section 49 of the shaft 26, so that the disc will rotate with the shaft. The upper end portions of the vessels 31 are held in their upright position by the disc 65, as by means of a plurality of bracing strips or arms 68 in the form of short sections of structural angles. Each arm 68 has its outer end bolted to a lug 69 welded on the outer surface of one of the vessels 31 and its inner end portion fixedly secured, as by bolting, to the upper surface of the disc 65.

The upper and lower distributive assemblages 32, 33 are identical in construction and, as shown in Fig. 4, each comprises an annular trough-shaped stationary member 34 having a plurality of compartments or manifolds formed therein; a tube sheet disc valve 35 slidably mounted on the shaft 26 for rotation therewith; and a spring support disc 36 fixedly mounted on the shaft 26 and supporting a plurality of coiled springs 37 which engage the tube sheet disc valve 35 and tightly press it against the open end of the annular stationary member 34.

Figures 8, 9:
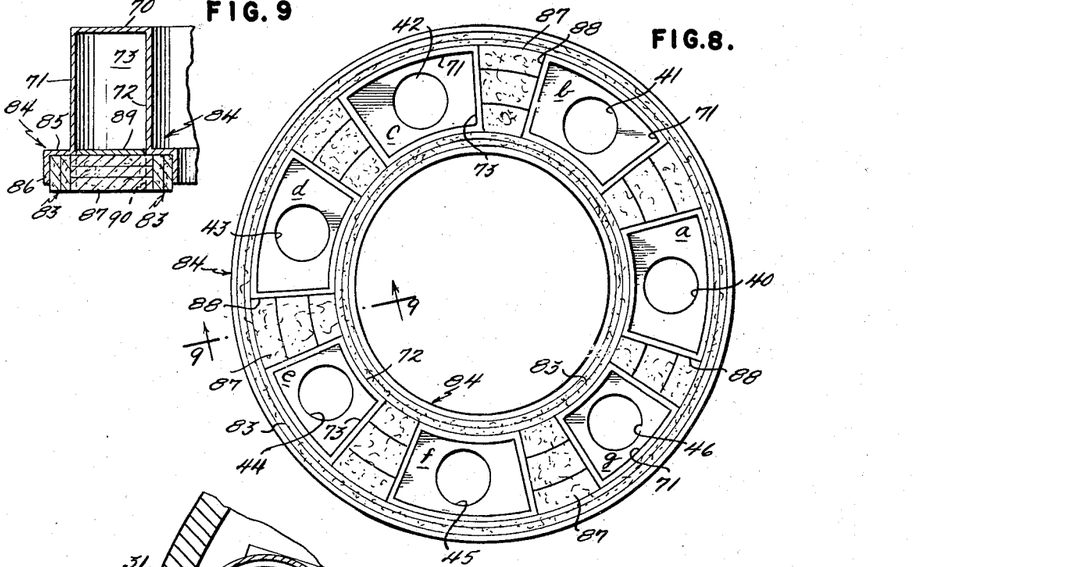
Fig. 8 is a horizontal sectional view taken on the line 8—8 of Fig. 4.
Fig. 9 is a detail sectional view, taken on the line 9—9 of Fig. 8.

The upper and lower annular stationary members 34 are identical in construction and, as shown in Figs. 4, 5, 8 and 9, each is formed in the shape of an annular trough having an annular top (or bottom) wall 70 and annular side walls, 71, 72 (see Figs. 4 and 9).

The member 34 is divided into a plurality of compartments or manifolds, as by means of a plurality of circumferentially spaced pairs of wall members 73 extending transversely of the member 34 and having their top (or bottom) and side walls welded to the top (or bottom) and side walls of the member 34 to form gas-tight joints. Seven such compartments or manifolds are shown and, for the purpose of clarity of description, designated manifolds *a, b, c, d, e, f* and *g*, respectively. See Fig. 8.

The upper member 34 of the upper distributive assemblage 32 is held stationary relative to the rotation of the shaft 26 and the upper tube sheet disc valve 35 by the upper inlet-outlet conduits 40, 41, 42, 43, 44, 45 and 46, which are welded to the upper cap closure member 23 and have their lower ends connected, as by welding, to the manifolds *a, b, c, d, e, f* and *g*, respectively, in the upper member 34 to provide communication therewith.

The lower member 34 of the lower distributive assemblage is held stationary relative to the rotation of the shaft 26 and the lower tube sheet disc valve 35 by the lower inlet-outlet conduits 40', 41', 42', 43', 44', 45' and 46', which are welded to the lower cap closure 24 and have their upper ends connected, as by welding, to the manifolds *a, b, c, d, e, f* and *g*, respectively, in the lower member 34 to provide communication therewith.

The upper and lower tube sheet disc valves 35 are identical in construction and, as shown in Fig. 4, each comprises a flat metal disc having a plurality of circumferentially spaced circular openings 74 formed in a circular row adjacent its periphery. The disc is provided with a collar 75 having a plurality of radially extending reinforcing ribs welded to its bottom surface or cast integral therewith. The collar 75 is keyed on the upper (lower) section of the shaft 26 to have longitudinal movement therealong as well as rotative movement therewith, as by means of a set screw 76 slidably engaging in a longitudinal groove 77 formed in the upper (lower) section of the shaft 26. A second collar 78 is fixedly secured to the shaft 26 immediately beneath the collar 75 to limit the inward movement of the disc as it moves longitudinally of the shaft 26. The disc 35, as well as the collar 75, are loosely fitted on the shaft 26 so that the disc valve can be moved slightly to conform to any change in the plane of the engaged surface of the stationary member 34, due to unequal expansion and contraction.

The tube sheet disc 35 is so mounted on the shaft 26 that it slidably engages the open bottom (top) end of the annular stationary member 34 with the circular row of openings 74 vertically aligned with the manifolds *a, b, c, d, e, f* and *g*, so that each manifold will be in communication with a group of the circular openings.

The upper and lower spring support discs 36 are identical in construction and, as shown in Fig. 4, each comprises a metal disc mounted on the shaft and having a hub 79 provided with a plurality of circumferentially spaced radial ribs or webs welded to the under face of the disc to strengthen it. The hub is fixedly secured to the shaft as by a set screw. A plurality of vertically extending circumferentially spaced coiled springs 37 are interposed between the tube sheet disc valve 35 and the spring support disc 36. In order to insure that the springs 37 remain in proper position, they are mounted on and between short stubs 80 extending upwardly from the disc 36 and short corresponding stubs 80' extending downwardly from the disc 35. The construction and arrangement is such that the springs 37 will keep the disc valve 35 evenly and firmly pressed into engagement with the under surface of the annular stationary member 34.

Figures 10, 11:
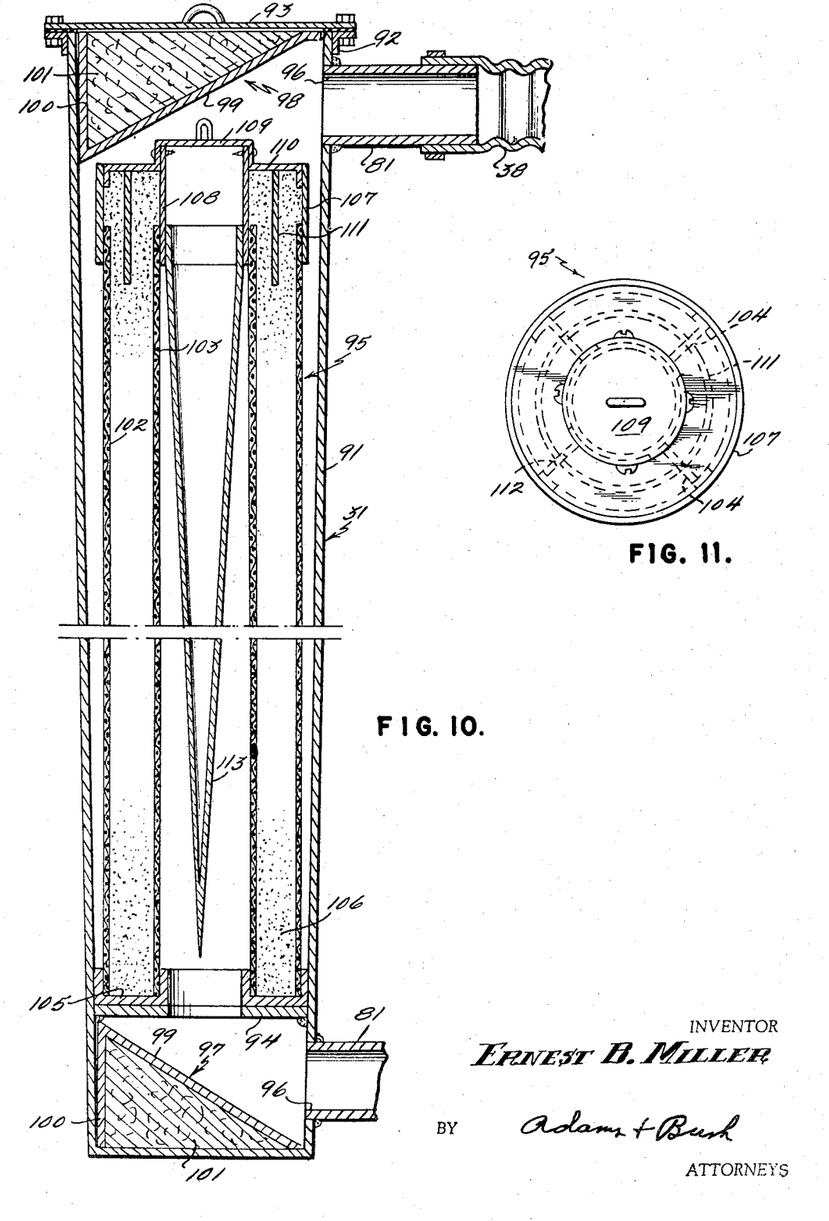
Fig. 10 is a vertical sectional view, with parts broken away, of the adsorbent material containing vessels shown in Fig. 4, showing the containers for holding the adsorbent material mounted therein.
Fig. 11 is a plan view of the container shown in Fig. 10.

The upper and lower flexible pipes 38, 39, which connect the upper and lower end portions of the adsorbent material containing vessels 31 to the upper and lower distributive assemblages are identical in construction and, as shown in Figs. 4 and 10, each comprises a thin walled cylindrical metal tube having the greater portion of its wall formed in a sinuous shape to give it flexibility, the outer cylindrical end of each tube is detachably secured to a nozzle 81 formed on the upper (lower) end portion of the vessel 31, as by strapping. The cylindrical inner end of the tube is provided with an integral flange 82. The opening in the cylindrical inner end of the tube is aligned with one of the circular openings 74 formed in the upper (lower) tube sheet disc valve 35 and the flange 82 is detachably secured to the outer surface of the disc valve, as by countersunk bolts, so that the inner surface of the disc wall will be smooth and uninterrupted (see Fig. 4).

To prevent the escape of gas between the rotating tube sheet disc valve 35 and the manifolds in the member 34, sealing ring gaskets 83 are placed at the juncture of the side walls of the member 34 and the disc valve 35. The ring gaskets 83 are wedged into annular troughs 84 secured, as by welding, to the outer surface of the side walls of the member 34. Each trough comprises an annular top (bottom) wall 85 and an annular side wall 86. The ring gaskets 83, preferably and as shown, comprise a plurality of annular strips of packing, generally rectangular in cross section and made of any suitable material, such as "Teflon" or impregnated asbestos.

The seven manifolds *a, b, c, d, e, f* and *g* are sealed off from each other by means of cross seals 87, each sealed into a recess 88 formed by the adjacent end walls of the manifolds and a bottom plate 89 vertically spaced from the open end of the manifolds (see Figs. 8 and 9). Each cross seal is tightly wedged in its recess with its outer ends in tight engagement with the adjacent side walls of the annular seals 83 and with its bottom surface in sealing engagement with the upper (lower) surface of the tube sheet disc. In order for the outer ends of the cross seals to engage the adjacent side walls of the annular seals 83, the portions of the side walls 71 and 72 of the member 34 which extend between each pair of adjacent transverse members 73 are cut away, as indicated at 90, for a distance equal to the thickness of the seals 83 (see Fig. 9).

The widths of the manifolds *a, b, c, d, e, f* and *g* are substantially the same as the internal diameters of the circular openings 74 in the tube sheet disc 35, so that each cross seal can effectively seal off one of the openings.

Each of the openings 74 formed in the upper tube sheet disc 35 is in vertical alignment with a corresponding one of the openings 74 formed in the lower tube sheet disc 35 and each of the cross seals 87 which separate the manifolds a, b, c, d, e, f and g formed in the upper stationary member 34 is in vertical alignment with a corresponding one of the cross seals 87 which separate the manifolds a, b, c, d, e, f and g formed in the lower stationary member 34.

When the rotary disc valve 35 and the vessels 31 are stationary, the foregoing arrangement, in effect, divides the adsorbent material containing vessels 31 into seven groups, with one group connected to communicate with the manifolds a, one group connected to communicate with the manifolds b, one group connected to communicate with the manifolds c, one group connected to communicate with the manifolds d, one group connected to communicate with the manifolds e, one group connected to communicate with the manifolds f, and one group connected to communicate with the manifolds g. Each group of vessels 31, together with the upper and lower manifolds with which they are in communication form separate flow passages through the adsorber so that seven separate, distinct and continuous flows of fluid may pass through the apparatus. Each flow entering the upper distributive assemblage by means of one of the inlet-outlet conduits 40, 41, 42, 43, 44, 45 or 46, thence through one of the groups of vessels 31 into the lower distributive assemblage and out through one of the inlet-outlet conduits 40', 41', 42', 43', 44', 45', or 46'. As the vessels 31 and the upper and lower disc valves 35 rotate, each of the flows of fluid will successively pass through the vessels 31. For convenience in description, each flow passage is called a stage, in which either adsorption, activation, or purging takes place, depending upon the particular fluid flowing therethrough. Also, the vessels 31 are called zones, in which either adsorption, activation, or purging takes place, depending upon the particular fluid flowing therethrough at a given time.

The silica gel containing vessels 31 are identical in construction and, as shown in Figs. 10 and 11, each comprises an elongated hollow tubular member 91 having a closed bottom end and an open upper end provided with a flanged collar 92 to which is secured, as by bolting, a removable cover plate 93.

A horizontally disposed annular disc 94 is mounted in the lower end portion of the member 91 and secured therein, as by welding, to form a gas-tight joint between the outer peripheral edge of the disc and the side wall of the member 91. The lower annular disc 94 forms a support for an elongated annular fluid treating material container 95. The container 95 is removably mounted within the member 91, with its bottom end resting on the annular disc 94 and with the longitudinal open end of the container aligned with the opening in the disc.

The tubular member 91 has a tapered side wall for a purpose hereinafter to be described and is provided with upper and lower circular openings 96 in which are secured, as by welding, the nozzles 81 to which the upper and lower flexible pipes 38 and 39 are secured.

A baffle member 97 is mounted in the space between the bottom of the member 81 and the annular disc 94, and an upper baffle member 98 is secured to the underside of the cover plate 93 and is removable therewith. The upper and lower baffle members 98 and 97 are identical in construction and, as shown in Fig. 10, each comprises a generally elliptical-shaped flat sheet 99 extending upwardly (downwardly) from the bottom (top) of the member 91 to insure an even flow of fluid through the member 91; a side wall forming member 100; and insulating material 101 placed within the pocket formed by the members 99 and 100 and the bottom (top) wall of the member 91 (see Fig. 10).

The containers 95 are identical in construction and, as shown in Figs. 10 and 11, each comprises two concentric tubular screens 102, 103, held in spaced-apart relation by a plurality of longitudinal radial fins 104, with the annular space between the screens closed at the bottom, as by a flanged annular plate 105. The mesh of the screens is such as to retain a granular adsorbent material 106 in the annular space between the screens. In the instant case, the adsorbent material may be of any adsorbent having characteristics substantially like silica gel or the gel of other activated hydrous oxides. Preferably, silica gel is used.

Each of the containers 95 is closed at its top by means of concentric hoops or metal bands 107, 108 mounted on the concentric screens 102, 103, and a cover plate 109 is detachably connected to the inner hoop or band 108, as by screws, and having a depending annular flange 110 fitting between the hoops or bands 107, 108. A depending cylindrical fin 111 is secured to the flange 110 and projects downwardly between and below the hoops or bands 107, 108, and fits in slits 112 formed in the upper ends of the radial fins 104, all as shown in Figs. 10 and 11. The construction is such that, as the silica gel settles down, leaving a space between the top portion of the wire screens devoid of silica gel, the fin 111 will prevent fluid from passing through the space.

Mounted within the inner wire screen 103 is an inverted substantially conically shaped baffle member 113. The baffle member 113 is closed at its apex which extends downwardly to a point near the bottom of the container and has its upper peripheral edge suitably secured to the band 108, as by welding. Preferably, the baffle member 113 is made of thin sheet metal.

When the container 95 is mounted within the hollow member 91, as shown in Fig. 10, the elongated annular space between the walls of the member 91 and the inverted conical baffle member 13 forms an elongated frusto-conically shaped duct which is annular in cross section. The annular container, filled with silica gel, is positioned in the duct between the members 91 and 113 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the members 91 and 113, as baffle members, the entire area is made use of with resultant increase in efficiency, capacity and economy.

Means may be provided so that the containers 95 which hold the adsorbent material may readily be removed from and replaced in the vessels 31. As shown, such means may comprise an opening 114 formed in the top of the vessel 20 having a cylindrical member 115 welded therein and provided with a readily removable closure disc 116 secured in the upper end of the member 115, as by means of a split shear ring 117 bolted thereto and fitted into a circumferential recess 118 formed in the inner surface of the member 115, and an O-ring packing 119 mounted between the closure disc 116 and the side wall of the member 115 to insure gas tightness.

The flows of the various gases through the various stages of the adsorbers and the auxiliary apparatus associated therewith are schematically shown in Fig. 1.

As the flow of the natural gas to be treated, the flows of the purging gases, and the flow of the recycling activation gas through each of the adsorbers is similar, only the flows of the gases through adsorber #1 will be described in detail.

In each of the adsorbers #1, #2 and #3, the gas being treated makes three passes through the adsorber, while the activation gas and each of the purging gases each make a single pass through the adsorber. For convenience in description, the stage of the adsorber through which the first adsorption passage of the gas being treated is made, is called the first adsorption stage, the stage through which the second adsorption passage is made is called the second adsorption stage, the stage through which the third adsorption passage is made is called the third adsorption stage, the stage through which the hot gas used for activation passes is called the activation stage, the stage through which the first purging gas passes is called the first purging stage, the stage through which the second purging gas passes is called the second purging stage, and the stage through which the third purging gas passes is called the third purging stage. Also, the vessels 31 are called zones in which either adsorption, activation, or purging takes place, depending upon the particular fluid flowing therethrough at a given time.

Figure 2:
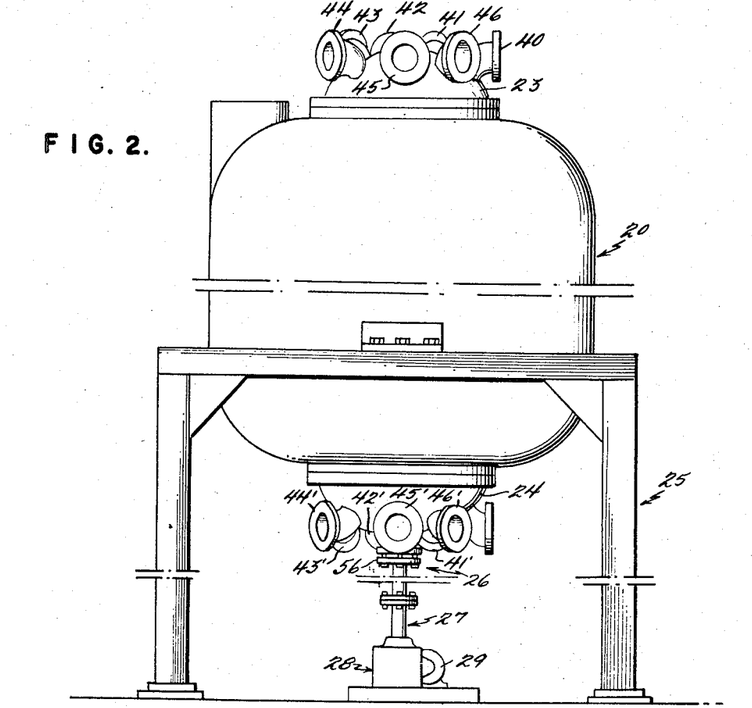
Fig. 2 is a side elevational view of the adsorber shown in Fig. 1.
Figure 3:
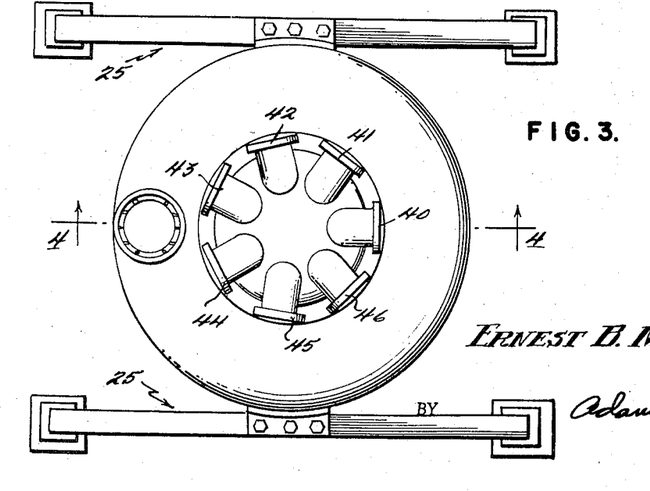
Fig. 3 is a plan view of the apparatus shown in Fig. 2.

In the particular embodimetn of the invention illustrated, the valve discs 35 and the vessels 31 of each adsorber are rotated clockwise, as viewed in Fig. 2, and at a rate such that the effluent gas flow from the purging stages will be substantially volumetric with the slippage gas brought into these stages as the vessels 31 are rotated; thus, it will be seen that, as the valves 35 and the vessels 31 rotate each of the vessels will be successively brought into communication with the manifolds g, f, e, d, c, b and a in the upper and lower distributive assemblages, so that each vessel 31 will, in turn, become a first purging zone, an activation zone, a second purging zone, a third purging zone, a third adsorption zone, a second adsorption zone, and a first adsorption zone.

Suitable stop valves are provided at any desired point in any pipe line to provide means for controlling the flow of the various mediums through the various stages of the adsorber and the auxiliary apparatus.

The natural gas to be treated is supplied under high pressure from about 800 p. s. i. to about 1000 p. s. i. from manifold pipe line 14 and enters manifold a of the upper distributive assemblage of adsorber #1 through valved pipe line 120 and inlet-outlet conduit 40. From manifold a the gas passes through openings 74 formed in the upper tube sheet disc valve 35 and flexible pipes 38 into the upper end portion of the group of vessels 31 which are at that time in communication with the manifold a. The gas passes down through the silica gel beds therein into the bottoms of the vessels. The baffle members 113, in cooperation with the tapered side walls of the vessels 31, insure a substantially uniform flow and distribution of the gas through the silica gel beds, which adsorb some of the $H_2S$ content from the gas. From the bottoms of the vessels 31, the now partially $H_2S$ stripped gas passes through outlet pipes 39 and openings 74 in the lower tube sheet disc valve 35 into the manifold a of the lower distributive assemblages.

From the lower manifold a of the lower distributive assemblage, the gas passes through inlet-outlet conduit 40' and pipe line 121 to the second adsorption stage and enters manifold b of the lower distributive assemblage through inlet-outlet conduit 41'. From the lower manifold b the gas passes through openings 74 in the tube sheet disc valve 35 and inlet pipes 39 into the lower end portion of the group of vessels 31 which are at that time in communication with manifold b. The gas passes upwardly through the vessels 31 of the second group and through the silica gel beds therein into the tops thereof, additional $H_2S$ being adsorbed from the gas during its passage through the silica gel beds.

From the tops of the vessels 31 of the second adsorption group, the gas passes through pipes 38 and openings 74 in the upper tube sheet disc valve of the upper distributive assemblage into the upper manifold b.

From the upper manifold b the gas passes through inlet-outlet pipe 41 and pipe line 122 to the third adsorption stage and enters upper manifold c of the upper distributive assemblage through inlet-outlet conduit 42.

From the upper manifold c the gas passes through openings 74 in the tube sheet disc valve 35 and inlet pipes 38 into the upper end portion of the group of vessels 31 which are at that time in communication with manifold c. The gas passes downwardly through the vessels 31 of the third group and through the silica gel beds therein into the bottoms thereof, additional $H_2S$ content of the gas being adsorbed during its passage through the silica gel beds.

From the bottoms of the vessels 31 of the third group, the gas passes through pipes 39 and openings 74 in the tube sheet disc valve 35 into the lower manifold c. From the lower manifold c the gas passes through inlet-outlet conduit 42' and valved pipe line 123 back to the manifold pipe 14 and thence through the cooler 13 associated with adsorber #1.

The removal and recovery of the $H_2S$ from the beds of adsorbent material is effected in the activation stage. The activation gas, a captive gas, preferably consisting substantially of $H_2S$, is heated in a heater 10, where its temperature is raised to from 250° F. to 400° F. From the heater, the heated activation gas passes through pipe line 124 and inlet-outlet conduit 45' into the lower manifold f of the lower distributive assemblage. From the manifold f the hot activation gas passes through openings 74 in the lower tube sheet disc valve 35 and flexible pipes 39 into the lower end portions of the groups of vessels 31 which are at that time in communication with manifold f. The gas passes upwardly through vessels 31 of the activation group and through the silica gel beds therein into the tops thereof. As the hot gas passes through the adsorbent material it removes the adsorbed $H_2S$ therefrom. From the tops of the vessels 31, the hot $H_2S$ laden gas passes through flexible pipes 38 and openings 74 in the lower tube sheet disc valve 35 into the upper manifold f. From the upper manifold f, the hot gas passes through inlet-outlet conduit 45 and pipe line 125 to the blower 11 and is recycled by the blower through pipe line 126 and the heater 10, back through the activation stage. This recirculation process is continuous.

The recirculating captive stream of activation gas is allowed to become highly concentrated in desorbed products by passing directly from the activation stage outlet back to the heater without any intermediate cooling.

In order to prevent slippage of activation gas, rich in desorbed products, into the outgoing stripped gas, and in order to prevent dilution of the highly concentrated activation gas, a first purging stage is provided ahead of and a second and third purging stage are provided following the activation stage.

The effluent gas from the second purging stage, which consists chiefly of slippage activation gas, is used as the purging gas for the first purging stage and passes from the second purging stage through pipe line 127 and inlet-outlet conduit 46' into the lower manifold g of the lower distributive assemblage of the first purging stage. From the lower manifold g the purging gas passes through openings 74 in the lower tube sheet disc valve 35 and flexible pipes 39 into the lower portions of the group of vessels 31 which are at that time in communication with manifold g. The gas passes upwardly through the vessels 31 of the first purging stage and through the silica gel beds therein into the tops thereof. As the purging gas passes through the adsorbent material it removes the slippage natural gas, thereby purging the beds. From the tops of the vessels 31 the effluent gas consisting substantially of slippage gas from the first adsorption stage passes through flexible pipes 38 and openings 74 in the upper tube sheet disc valve 35 into the upper manifold g. From the upper manifold g the gas passes through inlet-outlet conduit 46 and pipe line 128 to suction blower 12 and from blower 12 passes through pipe line 129 back into pipe line 120 and joins the natural gas being treated on its way to the adsorber.

The gas used as the purging gas in the second purging stage is obtained by continuously diverting a portion of the flow of the partially stripped natural gas through pipe line 123 from the last adsorption stage of the adsorber through pipe line 130 and inlet-outlet conduit 44' into the lower manifold e of the lower distributive assemblage. From the manifold e the purging gas passes through openings 74 in the lower tube sheet disc valve 35 and flexible pipes 39 into the lower end portion of the group of vessels 31 which are at that time in communication with manifold e. The gas passes upwardly through the vessels 31 of the second purging group and through the silica gel beds therein into the tops thereof. As the purging gas passes through the adsorbent material it removes any remaining activation gas or deposited vapors therefrom, thereby purging the beds. From the tops of the vessels 31, the effluent gas consisting substantially of slippage activation gas passes through flexible pipes 38 and openings 74 in the upper tube sheet disc valve 35 into the upper manifold e. From the upper manifold e the gas passes through inlet-outlet conduit 44 and pipe line 127 to the first purging stage of the adsorber.

A portion of the purging gas flowing through pipe line 130 is diverted and passes through pipe line 131 and inlet-outlet conduit 43' into manifold d of the lower distributive assemblage of the third purging stage. From the manifold d the purging gas passes through openings 74 in the tube sheet disc valve 35 and inlet pipe 39 into the lower end portion of the group of vessels which are at that time in communication with manifold d. The gas passes upwardly through the vessels 31 of the third purging group and through the silica gel beds therein into the tops thereof. The purging gas removes any remaining activation gas and purges the silica gel beds during its passage through the beds of the third purging stage.

From the tops of the vessels 31 of the third purging stage the effluent gas consisting substantially of slippage gas from the second purging stage passes through outlet pipes 38 and openings 74 in the upper tube sheet disc valve of the upper distributive assemblage into the upper manifold d. From the manifold d the gas passes through inlet-outlet conduit 43, pipe line 132, and pipe line 128 to the suction blower 12 and from blower 12 passes through pipe line 129 into pipe line 120 to join the gas being treated flowing through pipe line 120 on its way to the adsorber.

After passing through the cooler 13 associated with adsorber #1, the natural gas being treated passes from manifold pipe line 14 through valved pipe line 133 to the first adsorption stage of the adsorber #2, downwardly through the first adsorption stage, then through pipe line 134 to the second adsorption stage, upwardly through the second adsorption stage, then through pipe line 135 to the third adsorption stage, downwardly through the third adsorption stage, then through pipe line 136 back to the manifold pipe line 14 and then through cooler 13 associated with adsorber #2.

The activation gas used in adsorber #2, a captive gas, is heated in heater 10 associated with adsorber #2, where its temperature is raised from 250° F. to 400° F. From the heater, the heated activation gas passes through pipe line 137 to the activation stage, upwardly through the activation stage, then through pipe line 138 to the blower 11 associated with adsorber #2, and is recycled by the blower through pipe line 139 and the heater 10 back through the activation stage. This recycling process is continuous.

The effluent gas from the second purging stage of adsorber #2 passes through pipe line 140 to the first purging stage, then upwardly through the first purging stage. The effluent gas from the first purging stage passes through pipe line 141 to blower 12 associated with adsorber #2, thence through pipe line 142 back into pipe line 133 and joins the gas being treated on its way to adsorber #2.

A portion of the flow of the partially stripped natural gas through pipe line 136 is continuously diverted for use as the purging medium in the second purging stage and passes through pipe line 143 to the second purging stage, then upwardly through the second purging stage. A portion of the gas flowing through pipe line 143 is diverted for use as the purging medium in the third purging stage and passes through pipe line 144 to the third purging stage, thence upwardly through the third purging stage. The effluent gas from the third purging stage passes through pipe lines 145 and 141 to the blower 12 associated with adsorber #2, and from the blower 12 passes through pipe line 142 to join the gas being treated on its way to adsorber #2.

After passing through the cooler 13 associated with adsorber #2, the natural gas being treated passes from manifold pipe line 14 through valved pipe line 146 to the first adsorption stage of adsorber #3, downwardly through the first adsorption stage, then through pipe line 147 to the second adsorption stage, upwardly through the second adsorption stage, then through pipe line 148 to the third adsorption stage, downwardly through the third adsorption stage, thence through pipe line 149 back to the manifold pipe line 14 and then through cooler 13 associated with adsorber #3.

The activation gas used in adsorber #3, a captive gas, is heated in heater 10 associated with adsorber #3, where its temperature is raised from 250° F. to 400° F. From the heater the heated activation gas passes through pipe line 150 to the activation stage, upwardly through the activation stage, then through pipe line 151 to the blower 11 associated with adsorber #3, and is recycled by the blower through pipe line 152 and the heater 10 back through the activation stage. This recycling process is continuous.

The effluent gas from the second purging stage of adsorber #3 passes through pipe line 153 to the first purging stage, thence upwardly through the first purging stage. The effluent gas from the first purging stage passes through pipe line 154 to blower 12 associated with adsorber #3, thence through pipe line 155 back into pipe line 146 and joins the gas being treated on its way to adsorber #3.

A portion of the flow of the stripped natural gas through pipe line 149 is continuously diverted for use as the purging medium in the second purging stage and passes through pipe line 156 to the second purging stage, then upwardly through the second purging stage. A portion of the gas flowing through pipe line 156 is diverted for use as the purging medium in the third purging stage and passes through pipe line 157 to the third purging stage, thence upwardly through the third purging stage. The effluent gas from the third purging stage passes through pipe lines 158 and 154 to the blower 12 and from the blower 12 passes through pipe line 155 to join the gas being treated on its way to adsorber #3.

The $H_2S$ removed from the beds of adsorbent material by the recycling activation gas in each of the three adsorbers is recovered in the recovery cycle, in which a portion of the recycling activation gas used in adsorber #3 is diverted from pipe line 152 through pipe line 159 into the manifold bleed off pipe line 16 and from manifold pipe line 16 passes through pipe line 160 into pipe line 138 and joins the recycling activation gas used in adsorber #2. A portion of the recycling activation gas used in adsorber #2 is diverted from pipe line 139 through pipe line 161 into manifold pipe line 16 and from manifold pipe line 16 passes through pipe line 162 into pipe line 125 and joins the recycling activation gas used in adsorber #1; a portion of the recycling activation gas used in adsorber #1 is diverted from pipe line 126 through pipe line 163 into manifold pipe line 16 and passes through this pipe line into storage as the finished product.

In the foregoing description of the flows of the various fluids through the three adsorbers and the auxiliary apparatus associated therewith the cut off valves 18 mounted in the take off and return pipe lines connecting the adsorbers to the manifold pipe line 14 are all open while the cut off valves 15 in the manifold pipe line 14 are all closed. Also, the cut off valve 19 mounted in the take off and return pipe lines connecting the adsorbers to the bleed off manifold pipe line 16 are all open except for the valve 19 in the take off pipe line 164 to adsorber #3, which is closed. Also, the cut off valves 17 in the manifold bleed off pipe line 16 are closed.

While in the particular embodiment of the invention illustrated only three adsorbers have been employed in carrying out the process of the invention, obviously, the number of adsorbers required depends upon the $H_2S$ content of the natural gas being treated. For example, in order to recover substantially all of the $H_2S$ content of a gas containing 35% $H_2S$ by volume, it has been determined that at least ten adsorbers would be required.

From the foregoing, it readily will be seen that there has been provided a novel and improved cyclic adsorption process for removing and/or recovering a particular constituent of a gas; a process particularly adapted for the removal and recovery of the $H_2S$ content of natural gas having an unusually high $H_2S$ content.

While some of the flows of the fluids through the various stages of the adsorbers have been described as entering the top of the stage and flowing down to and out the bottom of the stage, obviously, the flows may be in either direction.

Obviously, too, the present invention is not restricted to the particular embodiment thereof herein shown and described.

What is claimed is:

1. A process for treating fluids to remove and/or recover a particular constituent therein, comprising maintaining at least one bed of adsorbent material in each zone of a series of groups of zones; continuously heating and recycling separate flows of captive activation medium through one zone of each group of zones to desorb said particular constituent contained in the adsorbent material therein; continuously directing separate first flows of a purging medium through at least another zone of each group of zones; continuously directing separate second flows of a purging medium through at least another one of the zones of each group of zones; continuously directing a flow of the fluid being treated in succession through the remaining zones in each group of said series of groups of zones so that the particular constituent of the fluid will be adsorbed by the adsorbent material therein; periodically shifting the relative positions of the particular adsorbent material and the particular flow of fluid in each zone of said groups of zones so that each zone in each group of said zones becomes, in succession, a first purging zone, an activation zone, a second purging zone and an adsorption zone; in each group of zones continuously directing the flow of the effluent gas from the second purging zone into the first purging zone for use as the purging medium in the first purging zone, continuously directing the flow of the effluent fluid from the first purging zone back into the flow of the fluid being treated on its way to the first adsorption zone and continuously directing a portion of the effluent fluid from the last adsorption zone for use as the purging medium in the second purging zone; and in each group of zones starting with the group through which the fluid being treated last passes continuously bleeding off a determined quantity of the recycling flow of activation medium and passing it into the flow of the recycling activation medium in the next succeeding group of said groups of zones whereby the recycling activation medium in the first group of said groups of zones through which the fluid being treated passes will become highly concentrated in desorbed particular constituent; and continuously withdrawing a portion of the activation medium in said first group of said groups of zones after it has become highly concentrated in desorbed particular constituent, as the finished product.

2. A process for treating fluids to remove and/or recover a particular constituent therein, comprising in each group of a series of groups of zones, rotating beds of adsorbent material through a first purging zone, an activation zone, a second purging zone, and a plurality of adsorption zones; continuously directing a flow of the fluid to be treated, in succession, through the adsorption zones in each group of said series of groups of zones so that the particular constituent content of the fluid will be adsorbed by the adsorbent material therein; continuously heating and recycling separate flows of captive activation medium through the activation zones of said series of groups of zones to desorb the particular constituent contained in the adsorbent material therein; in each group of zones continuously diverting a portion of the flow of the effluent fluid from the last of the adsorption zones and directing its flow through the second purging zone; continuously directing the flow of the effluent fluid from the second purging zone into the first purging zone and continuously directing the flow of the effluent fluid from the first purging zone into the flow of the fluid being treated on its way to the first adsorption zone; and in each group of zones starting with the group through which the fluid being treated last passes, continuously bleeding off a determined quantity of the recycling activation medium and passing it into the recycling activation medium in the next succeeding group of the series of groups of zones; and continuously bleeding off a determined quantity of the recycling activation medium in the first group of zones through which the fluid being treated passes, as the finished product.

3. A method of removing and recovering $H_2S$ from natural gas containing a high percentage of $H_2S$ from which water vapor and condensable hydrocarbons have previously been removed therefrom, comprising maintaining at least one bed of adsorbent material in each zone of a series of groups of zones; continuously heating and recycling separate flows of captive activation medium through one zone of each group of zones to desorb the $H_2S$ contained in the adsorbent material therein; continuously directing separate first flows of a purging medium through at least another zone of each group of zones; continuously directing separate second flows of a purging medium through at least another one of the zones of each group of zones; continuously directing a flow of the natural gas being treated in succession through the remaining zones in each group of said series of groups of zones so that the $H_2S$ content will be adsorbed by the adsorbent material therein; periodically shifting the relative positions of the particular absorbent material and the particular flow of fluid in each zone of said groups of zones so that each zone in each group of said zones becomes, in succession, a first purging zone, an activation zone, a second purging zone and an adsorption zone; in each group of zones, continuously directing the flow of the effluent gas from the second purging zone into the first purging zone for use as the purging medium in the first purging zone, continuously directing the flow of the effluent gas from the first purging zone back into the flow of the gas being treated on its way to the first adsorption zone, and continuously directing a portion of the effluent gas from the last absorption zone for use as the purging medium in the second purging zone; and in each group of zones starting with the group through which the fluid being treated last passes continuously bleeding off a determined quantity of the recycling flow of activation medium and passing it into the flow of the recycling activation medium in the next succeeding group of said groups of zones whereby the recycling activation medium in the first group of said groups of zones through which the natural gas being treated passes will become highly concentrated in desorbed $H_2S$; and continuously withdrawing a portion of the activation medium in the first group of said groups of zones after it has become highly concentrated in $H_2S$, as the finished product.

4. The method as set forth in claim 3, including the step of cooling the natural gas being treated as it passes from one group of zones to the next succeeding group of zones in said series of groups of zones.

5. A method of removing and recovering $H_2S$ from natural gas containing a high percentage of $H_2S$ from which water vapor and condensable hydrocarbons have previously been removed therefrom, comprising in each group of a series of groups of zones, rotating beds of adsorbent material through a first purging zone, an activation zone, a second purging zone, and a plurality of adsorption zones; continuously directing a flow of the gas to be treated, in succession, through the adsorption zones in each group of said series of groups of zones so that the $H_2S$ content of the gas will be adsorbed by the adsorbent material therein; continuously heating and recycling separate flows of captive activation medium through the activation zones of said series of groups of zones to desorb the $H_2S$ contained in the adsorbent material therein; in each group of zones continuously diverting a portion of the flow of the effluent gas from the last of the adsorption zones and directing its flow through the second purging zone; continuously directing the flow of the effluent gas from the second purging zone into the first purging zone and continuously directing the flow of the effluent gas from the first purging zone into the flow of the gas being treated on its way to the first adsorption zone; and in each group of zones starting with the group through which the gas being treated last passes, continuously bleeding off a determined quantity of the recycling activation medium and passing it into the recycling activation medium in the next succeeding group of the series of groups of zones; and continuously bleeding off a determined quantity of the recycling activation medium in the first group of zones through which the gas being treated passes, as the finished product.

6. The method as set forth in claim 5, including the step of cooling the natural gas being treated as it passes from one group of zones to the next succeeding group of zones in said series of groups of zones.

7. A system for recovering $H_2S$ from natural gas containing a high percentage of $H_2S$ comprising in combination, a series of adsorbers, each including a plurality of zones in each of which at least one bed of adsorbent material is adapted to be maintained; means associated with each of said adsorbers including a heater, a blower and piping for continuously heating and recycling a captive activation medium through one zone of the adsorber; means associated with each of said adsorbers including piping connected to direct a flow of a purging medium through a zone immediately preceding the zone through which the activation medium is being recycled; means associated with each of said adsorbers including piping connected to direct a flow of a purging medium through a zone immediately following the zone through which the activation medium is being recycled; means associated with each of said adsorbers including piping connected to pass a flow of the gas to be treated, in succession, through the remainder of said zones of the adsorber and then into the next succeeding adsorber of said series of adsorbers; means associated with each of said adsorbers including piping and valve means for periodically shifting the relative positions of the particular adsorbent material and the particular flow of fluid in each of said zones so that each zone becomes, in succession, a first purging zone, an activation zone, a second purging zone and an adsorption zone; means associated with each adsorber including pipe lines for continuously directing the flow of the effluent gas from the second purging zone into the first purging zone; means including a piping for continuously diverting a portion of the flow of gas being treated from the last of the adsorption zones into the second purging zone; means including piping for directing the flow of the effluent gas from the first purging zone into the flow of the gas being treated on its way to the adsorber; means including a piping for bleeding off a portion of the recycling flow of activation medium in each of said adsorbers into the next succeeding adsorber in said series of adsorbers in a direction counter-current to the flow of the gas being treated therethrough; and means including piping for bleeding off a portion of the recycling flow of activation medium in the adsorber through which the gas being treated first passes as the finished product.

8. Apparatus as set forth in claim 7 including a plurality of heat exchangers, one associated with each of said adsorbers for cooling the gas being treated as it passes from one adsorber to the next succeeding adsorber.

9. A process for treating fluids to remove and/or recover a particular constituent therein, comprising maintaining at least one bed of adsorbent material in each zone of a series of groups of zones; continuously heating and recycling separate flows of captive activation medium through one zone of each group of zones to desorb said particular constituent contained in the adsorbent material therein; continuously directing separate first flows of a purging medium through at least another zone of each group of zones; continuously directing separate second flows of a purging medium through at least another one of the zones of each group of zones; continuously directing separate third flows of a purging medium through at least another one of the zones of each group of zones; continuously directing a flow of the fluid being treated in succession through the remaining zones in each group of said series of groups of zones so that the particular constituent of the fluid will be adsorbed by the adsorbent material therein; periodically shifting the relative positions of the particular adsorbent material and the particular flow of fluid in each zone of said groups of zones so that each zone in each group of said zones becomes, in succession, a first purging zone, an activation zone, a second purging zone, a third purging zone and an adsorption zone; in each group of zones continuously directing the flow of the effluent gas from the second purging zone into the first purging zone for use as the purging medium, continuously directing the flow of the effluent fluid from the first and third purging zones back into the flow of the fluid being treated on its way to the first adsorption zone and continuously directing a portion of the effluent fluid from the last adsorption zone for use as the purging medium in the second and third purging zones; and in each group of zones starting with the group through which the fluid being treated last passes continuously bleeding off a determined quantity of the recycling flow of activation medium and passing it into the flow of the recycling activation medium in the next succeeding group of said groups of zones whereby the recycling activation medium in the first group of said groups of zones through which the fluid being treated passes will become highly concentrated in desorbed particular constituent; and continuously withdrawing a portion of the activation medium in first group of said groups of zones after it has become highly concentrated in desorbed particular constituent as the finished product.

10. The method as set forth in claim 9, including the step of cooling the fluid being treated as it passes from one group of zones to the next succeeding group of zones in said series of groups of zones.

11. A process for treating fluids to remove and/or recover a particular constituent therein, comprising in each group of a series of groups of zones, rotating beds of adsorbent material through a first purging zone, an activation zone, a second purging zone, a third purging zone, and a plurality of adsorption zones; continuously directing a flow of the fluid to be treated, in succession, through the adsorption zones in each group of said series of groups of zones so that the particular constituent content of the fluid will be adsorbed by the adsorbent material therein; continuously heating and recycling separate flows of captive activation medium through the activation zones of said series of groups of zones to desorb the particular constituent contained in the adsorbent material therein; in each group of zones continuously diverting a portion of the flow of the effluent fluid from the last of the adsorption zones and directing its flow through the second and third purging zones; continuously directing the flow of the effluent fluid from the second purging zone into the first purging zone and continuously directing the flow of the effluent fluids from the first and third purging zones into the flow of the fluid being treated on its way to the first adsorption zone; and in each group of zones starting with the group through which the fluid being treated last passes, continuously bleeding off a determined quantity of the recycling activation medium and passing it into the recycling activation medium in the next succeeding group of the series of groups of zones; and continuously bleeding off a determined quantity of the recycling activation medium in the first group of zones through which the fluid being treated passes, as the finished product.

12. A method of removing and recovering $H_2S$ from natural gas containing a high percentage of $H_2S$ from which water vapor and condensable hydrocarbons have previously been removed therefrom, comprising maintaining at least one bed of adsorbent material in each zone of a series of groups of zones; continuously heating and recycling separate flows of captive activation medium through one zone of each group of zones to desorb the $H_2S$ contained in the adsorbent material therein; continuously directing separate first flows of a purging medium through at least another zone of each group of zones; continuously directing separate second flows of a purging medium through at least another one of the zone of each group of zones; continuously directing separate third flows of a purging medium through at least another one of the zones of each group of zones; continuously directing a flow of the natural gas being treated in succession through the remaining zones in each group of said series of groups of zones so that the $H_2S$ content will be adsorbed by the adsorbent material therein; periodically shifting the relative positions of the particular adsorbent material and the particular flow of fluid in each zone of said groups of zones so that each zone in each group of said zones becomes, in succession, a first purging zone, an activation zone, a second purging zone, a third purging zone, and an adsorption zone; in each group of zones, continuously directing the flow of the effluent gas from the second purging zone into the first purging zone for use as the purging medium, continuously directing the flow of the effluent gas from the first and third purging zones back into the flow of the gas being treated on its way to the first adsorption zone, and continuously directing a portion of the effluent gas from the last adsorption zone for use as the purging medium in the second and third purging zones; and in each group of zones starting with the group through which the natural gas being treated last passes continuously bleeding off a determined quantity of the recycling flow of activation medium and passing it into the flow of the recycling activation medium in the next succeeding group of said groups of zones whereby the recycling activation medium in the first group of said groups of zones through which the natural gas being treated passes will become highly concentrated in desorbed $H_2S$; and continuously withdrawing a portion of the activation medium in said first group of said groups of zones after it has become highly concentrated in $H_2S$, as the finished product.

13. A method of removing and recovering $H_2S$ from natural gas containing a high percentage of $H_2S$ from which water vapor and condensable hydrocarbons have previously been removed therefrom, comprising in each group of a series of groups of zones, rotating beds of adsorbent material through a first purging zone, an activation zone, a second purging zone, a third purging zone, and a plurality of adsorption zones; continuously directing a flow of the gas to be treated, in succession, through the adsorption zones in each group of said series of groups of zones so that the $H_2S$ content of the gas will be adsorbed by the adsorbent material therein; continuously heating and recycling separate flows of captive activation medium through the activation zones of said series of groups of zones to desorb the $H_2S$ contained in the adsorbent material therein; in each group of zones continuously diverting a portion of the flow of the effluent gas from the last of the adsorption zones and directing its flow through the second and third purging zones; continuously directing the flow of the effluent gas from the second purging zone into the first purging zone and continuously directing the flow of the effluent gas from the first and third purging zones into the flow of the gas being treated on its way to the first adsorption zone; and in each group of zones starting with the group through which the gas being treated last passes, continuously bleeding off a determined quantity of the recycling activation medium and passing it into the recycling activation medium in the next succeeding group of the series of groups of zones; and continuously bleeding off a determined quantity of the recycling activation medium in the first group of zones through which the gas being treated passes, as the finished product.

14. The method as set forth in claim 13, including the step of cooling the natural gas being treated as it passes from one group of zones to the next succeeding group of zones in said series of groups of zones.

References Cited in the file of this patent

UNITED STATES PATENTS 2,799,361    Miller  ---------------- July 16, 1957